United States Patent
Alanara et al.

(10) Patent No.: US 7,065,382 B2
(45) Date of Patent: Jun. 20, 2006

(54) WIRELESS TERMINAL HAVING A SCANNER FOR ISSUING AN ALERT WHEN WITHIN THE RANGE OF A TARGET WIRELESS TERMINAL

(75) Inventors: Seppo Alanara, Tokyo (JP); Jari Puputii, Yokokama (JP); Hawk Yin Pang, Tokyo (JP); Tatu Koljonen, Tokyo (JP)

(73) Assignee: Nokia Corporation, Espoo (FI)

( * ) Notice: Subject to any disclaimer, the term of this patent is extended or adjusted under 35 U.S.C. 154(b) by 288 days.

(21) Appl. No.: 10/022,524

(22) Filed: Dec. 20, 2001

(65) Prior Publication Data

US 2003/0119494 A1 Jun. 26, 2003

(51) Int. Cl.
*H04M 1/00* (2006.01)
*G06F 17/00* (2006.01)
*G06F 5/00* (2006.01)
*G02B 26/10* (2006.01)

(52) U.S. Cl. ............ 455/556.1; 455/557; 235/375; 235/462.25; 235/380

(58) Field of Classification Search ............ 455/426.1, 455/466, 41, 421, 556.1, 557; 380/247; 235/375, 235/462.25, 380
See application file for complete search history.

(56) References Cited

U.S. PATENT DOCUMENTS

| | | | | |
|---|---|---|---|---|
| 5,086,394 A | * | 2/1992 | Shapira | 705/1 |
| 5,359,182 A | * | 10/1994 | Schilling | 235/380 |
| 6,002,946 A | * | 12/1999 | Reber et al. | 455/557 |
| 6,036,086 A | * | 3/2000 | Sizer et al. | 235/375 |
| 6,212,401 B1 | * | 4/2001 | Ackley | 455/556.1 |
| 6,477,383 B1 | * | 11/2002 | Jyogataki et al. | 455/466 |
| 6,539,232 B1 | * | 3/2003 | Hendrey et al. | 455/456.1 |
| 6,549,768 B1 | * | 4/2003 | Fraccaroli | 455/456.3 |
| 6,575,368 B1 | * | 6/2003 | Tamburrini et al. | 235/462.25 |
| 6,611,692 B1 | * | 8/2003 | Raffel et al. | 320/115 |
| 6,635,432 B1 | * | 10/2003 | Welsh et al. | 435/7.21 |
| 6,687,346 B1 | * | 2/2004 | Swartz et al. | 379/93.12 |
| 6,694,143 B1 | * | 2/2004 | Beamish et al. | 455/456.1 |
| 2002/0077130 A1 | * | 6/2002 | Owensby | 455/466 |
| 2002/0126845 A1 | * | 9/2002 | Hue et al. | 380/247 |
| 2002/0147009 A1 | * | 10/2002 | Kocheisen | 455/426 |
| 2003/0083011 A1 | * | 5/2003 | Haller et al. | 455/41 |

\* cited by examiner

*Primary Examiner*—William Trost
*Assistant Examiner*—Kiet Doan
(74) *Attorney, Agent, or Firm*—Alston & Bird LLP

(57) ABSTRACT

A wireless terminal, method, and system for using the wireless terminal, for determining when the wireless terminal enters a coverage area of a target device within which communications are possible with the target device and alerting the user of the wireless terminal that such an area has been entered.

14 Claims, 4 Drawing Sheets

WIRELESS TERMINAL HAVING A SCANNER FOR ISSUING AN ALERT WHEN WITHIN THE RANGE OF A TARGET WIRELESS TERMINAL

BACKGROUND OF THE INVENTION

The present invention relates generally to wireless communications. More particularly, the present invention relates to a wireless terminal, method, and system for using the same, for issuing an alert when the wireless terminal is within range of a target device where communications can be conducted with the target device.

Handheld global positioning system (GPS) devices are well known. Such devices display the position of the device (longitude and latitude) relative to a map. These devices do not communicate with each other and cannot indicate to each other their positions relative to one another.

Further, these devices have undesirable limited accuracy since they make use of non-military GPS systems inhibiting the devices from providing location data having accuracy necessary to locate objects such as a car in a big parking lot, a person such as a child in a crowd, a theme park, or even a fixed known location such as a restaurant.

Still further, such devices do not perform communications and as such do not notify the user when they are within range of a target device where communications can be conducted with the target device.

Accordingly, a need exists in the wireless communications art for a wireless terminal capable of communicating with a target device and notifying a user of the wireless terminal when the wireless terminal is within range of the target device where communications can be conducted.

SUMMARY OF THE INVENTION

The present invention is directed to a wireless terminal, method, and system for using the wireless terminal, for determining when the wireless terminal enters a coverage area of a target device having predefined identifying information, wherein the coverage area is an area within which communications are possible with the target device, and notifying the user of the wireless terminal that such an area has been entered.

The wireless terminal of the present invention includes an input device for inputting commands and data, an output device for outputting information, a transmitter/receiver circuit for transmitting and receiving wireless signals and a controller for controlling the input device, the output device and the transmitter/receiver circuit.

The controller of the wireless terminal of the present invention is settable by a user to one of a plurality of operation modes including a scanner mode. The scanner mode according to the present invention causes the wireless terminal to scan received wireless signals to determine whether identifying wireless signals identifying a target device as being associated with predefined information have been received and if the identifying wireless signals have been received outputting via the output device an indication that the wireless terminal is within range of the target device where communications with the target device can be conducted. The operation modes of the wireless terminal could also include a target mode which causes the wireless terminal to operate as a target device and transmit identifying wireless signals identifying the wireless terminal as being associated with predefined information. The target device could also be a base station.

The predefined information can, for example, be information input by the user of the device identifying particular information the user wishes to have known by others to permit their response to such information when in range of the user's device. This information could, for example, be the user's name, hobbies, marital status, etc. The user of the wireless terminal can set the scanner mode to scan for identifying wireless signals indicating that the device that issued the identifying wireless signals has associated thereto predefined information input by the user of the device.

BRIEF DESCRIPTION OF THE DRAWINGS

The scope of the present invention will be apparent from the following detailed description, when taken in conjunction with the accompanying drawings, and such detailed description and specific examples, while indicating example embodiments of the invention, are given by way of illustration only, since various changes and modifications within the spirit and scope of the invention will become apparent to those skilled in the art from this detailed description in which.

DETAILED DESCRIPTION OF THE INVENTION

Figure 1:
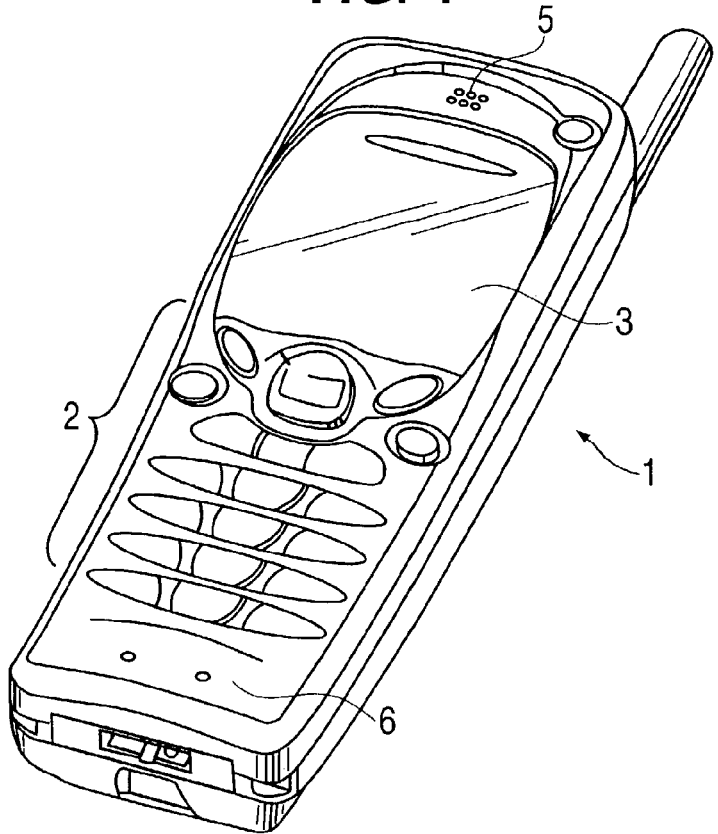
FIG. 1 schematically illustrates a wireless terminal according the present invention.
Figure 2:
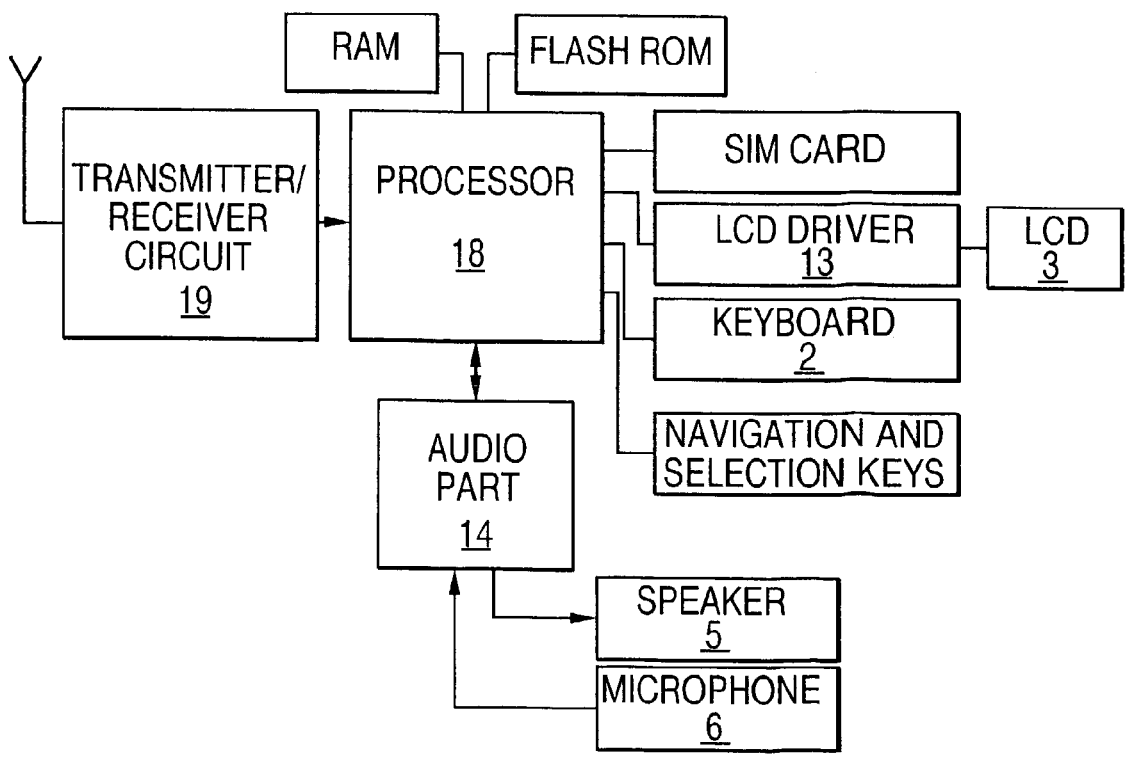
FIG. 2 illustrates a block diagram of the main elements of a wireless terminal.

FIG. 1 illustrates the exterior configuration of a wireless terminal 1 whereas FIG. 2 illustrates the internal configuration of the wireless terminal 1. The wireless terminal 1, includes a user interface having an input device which could, for example, be a keypad 2 and/or a touch sensitive screen provided on a display 3 or a microphone 6 and an output device which could, for example, be the display 3 or a speaker 5. The wireless terminal 1 is adapted for communications via a wireless network, e.g., a cellular network, bluetooth network, wireless local area network (LAN).

The keypad 2 has alphanumeric and functions keys which allow the user to enter a telephone number, write a text message including messages to be sent by Short Message Service (SMS), write a name (associated with the telephone number), etc. As illustrated in FIG. 2, each of the above described input devices and output devices are controlled by a controller which could, for example, be a processor 18. The processor interfaces to the display 3 which could, for example, be a liquid crystal display (LCD) via a LCD driver 13. The processor 18 also interfaces to the speaker 5 and the microphone 6 via an audio part 14. A transmitter/receiver circuit 19 is also controlled by the processor 18 for transmitting and receiving wireless signals from and in the wireless terminal 1. The wireless terminal 1 can also include other elements such as a RAM, flash ROM, SIM card which used by the processor 18 so to implement the various functions of the wireless terminal 1.

Figure 3:
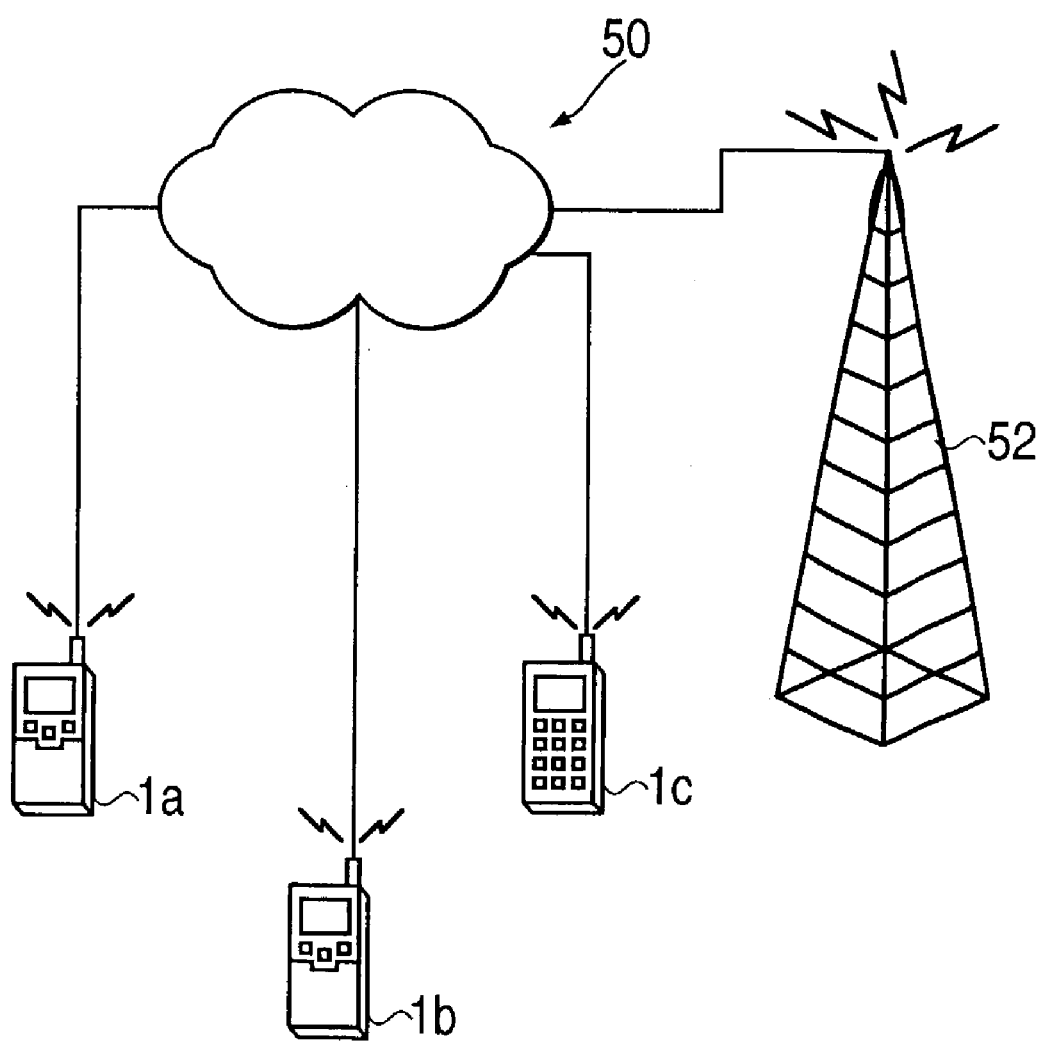
FIG. 3 illustrates a network including a plurality of the wireless terminals shown in FIG. 1.

FIG. 3 schematically illustrates a network 50 serviced by a base station 52 and a plurality of wireless terminals 1a, 1b and 1c each of which has the elements described above with respect to the wireless terminal 1. Each of the wireless terminals 1a–c can communicate with each other via the base station 52 or directly to each other using wireless signals, such as Bluetooth.

A unique feature of the present invention is that a function (scanner mode) is provided within each of the wireless terminals 1a–c for issuing an alert when the wireless terminal 1a–c is within range of a target device where communications can be conducted with the target device. It should be noted that the alert disclosed herein is described as being issued when the wireless terminal 1a–c enters a coverage area of the target device. A similar alert can also be issued in the target device indicating that a wireless terminal 1a–c has entered the coverage area of the target device.

The alert can also be issued in a manner opposite to that described above, such as when the wireless terminal 1a–c exits the coverage area of the target device. Here again, a similar alert can be issued in the target device indicating that a wireless terminal 1a–c has exited the coverage area of the target device. Therefore, at each instance where the alert is described as being issued it should be understood that this issuing of the alert is inclusive of all of the above described manners for issuing the alert, even though only one method may be described.

The target device could, for example, be another of the wireless terminals 1a–c, the base station 52, or any other such device which emits identifying wireless signals which identify the target device as being associated with predefined information, thereby indicating the target device as one for which communications between the wireless terminal 1a–c and the target device can be conducted.

The predefined information can, for example, be information input by the user of the device identifying particular information the user wishes to have known by others to permit their response to such information when in range of the user's device. This information could, for example, be the user's name, hobbies, marital status etc. The user of the wireless terminal can set the scanner mode to can for identifying wireless signals indicating that the device that issued the identifying wireless signals has associated thereto predefined information input by the user of the device.

The function of the present invention described above is implemented in the wireless terminal 1a–c, for example, by the processor 18 executing particular software (computer program) causing the processor 18 to control the operations of the input device, output device and transmitter/receiver circuit 19. This program can be preinstalled in memory or later installed by upgrade Thus, for example, the wireless terminal 1a when implementing the above described function of the present invention issues an alert to the user of wireless terminal 1a as it enters a range or area surrounding the base station 52 or wireless terminal 1b where communications with the base station 52 or wireless terminal 1b can be conducted. This alert can take the form of a sound output by the speaker, an indicator/icon or text output on the LCD 3, or vibrations output by a vibrator (not shown) within the wireless terminal 1a. This alert is generated in such a manner so as to ensure that the user of the wireless terminal 1a receives this notification without having to check the received signal indicator on the wireless terminal 1a at frequent intervals.

A further unique feature of the present invention is that a further function (target mode) can be provided within each of the wireless terminals 1a–c or the base station 52 causing the wireless terminal 1a–c or base station 52 to act as a target device by issuing identifying wireless signals identifying the target device as being associated with predefined information. These identifying wireless signals identify the wireless terminal 1a–c or base station 52 as a device for which communications can be established. The predefined information as described above can, for example, be information input by the user of the device identifying particular information the user wishes to have known by others to permit their response to such information when in range of the user's device. This information could, for example, be the user's name, hobbies, marital status, etc. The user of the wireless terminal can set the scanner mode to scan for identifying wireless signals indicating that the device that issued the identifying wireless signals has associated thereto predefined information input by the user of the device.

The identifying wireless signals are received by wireless terminals 1a–c when the wireless terminals 1a–c are within range of the target device. This range can be of any dimension as defined by the particular wireless protocol being used e.g., cellular network, Bluetooth network, wireless local area network (LAN).

It should be noted that any device can act as a target device so long as the device can emit identifying wireless signals which identify the device as being associated with predefined information and one for which communications between the wireless terminal 1a–c and the target device can be conducted.

The further function of the present invention described above is implemented in the wireless terminal 1a–c, for example, by the processor 18 executing particular software (computer program) causing the processor 18 to control the operations of the input device, output device and transmitter/receiver circuit 19. This program can be preinstalled in memory or later installed by upgrade.

Similar apparatus and software (computer program) can be provided in the base station 52 and any other device that acts as a target device so as to implement this further function of the present invention.

Thus, for example, the wireless terminal 1a or the base station 52 when implementing the above described further function of the present invention issues identifying wireless signals indicating that the wireless terminal 1a or the base station 52 is associated with predefined information and that any of the wireless terminals 1a–c within range of receipt of the identifying wireless signals can establish communications with the wireless terminal 1a or base station 52. Any wireless terminal 1a–c receiving the identifying wireless signals implements the above described function of the present invention of alerting the user of wireless terminal 1a–c that it has entered a range or area surrounding the wireless terminal 1a or base station 52 where communications with the wireless terminal 1a or base station 52 can be conducted.

Figure 4:
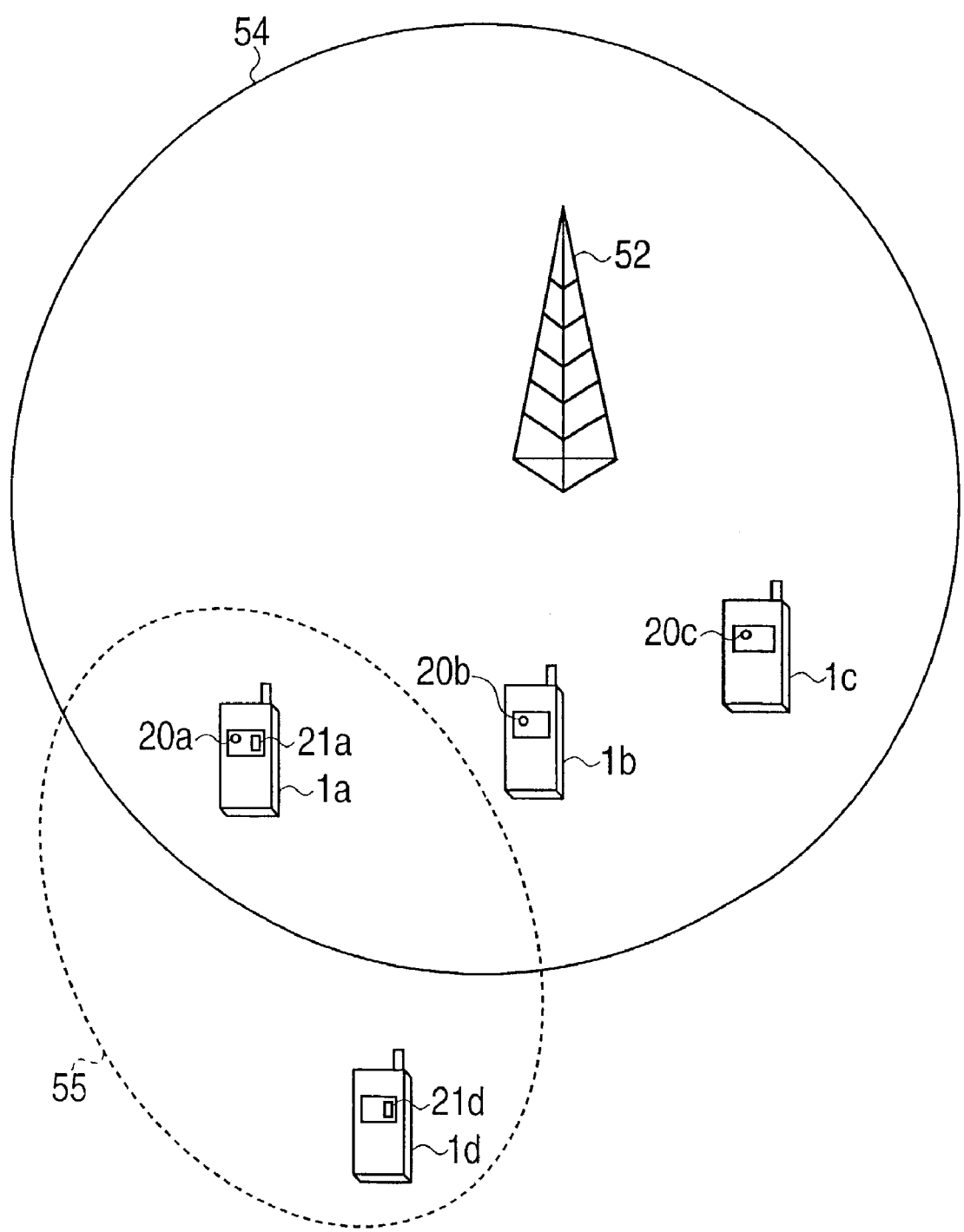
FIG. 4 is a schematic diagram of a network and its coverage area.

To further explain the above FIG. 4 illustrates the present invention where a plurality of wireless terminals 1a–d operates in association with a base station 52. The base station 52 acting as a target device has a coverage area 54 and wireless terminal 1a acting as a target device has a coverage area 55. As shown since wireless terminals 1a–c are within the coverage area 54 of the base station 52, each of these wireless terminals 1a–c receives the identifying wireless signals emitted by the base station 52 and alerts their users that communication can be established with the base station 52. As described above this alert can be provided by sound, vibration or an indication/icon or text 20a–c on the display of the wireless terminal 1a–c.

Since the wireless terminal 1d is outside of the coverage area 54, wireless terminal 1d does not receive the identifying wireless signals emitted by the base station 52 and therefore does not alert the user that communication can be established with the base station 52. However, the wireless terminal 1*d* is within the coverage area 55 of the wireless terminal 1*a*. Thus, the wireless terminal 1*d* receives the identifying wireless signals emitted by the wireless terminal 1*a* and alerts its user that communication can be established with the wireless terminal 1*a*. As described above this alert can be provided by sound, vibration or an indication/icon or text 21*d* on the display of the wireless terminal 1*d*. A similar alert can be provided in the wireless terminal 1*a* acting as a target device. As described above this alert provided on the wireless terminal 1*a* can be provided by sound, vibration or an indication/icon or text 21*a* on the display of the wireless terminal 1*a*.

Figure 5:
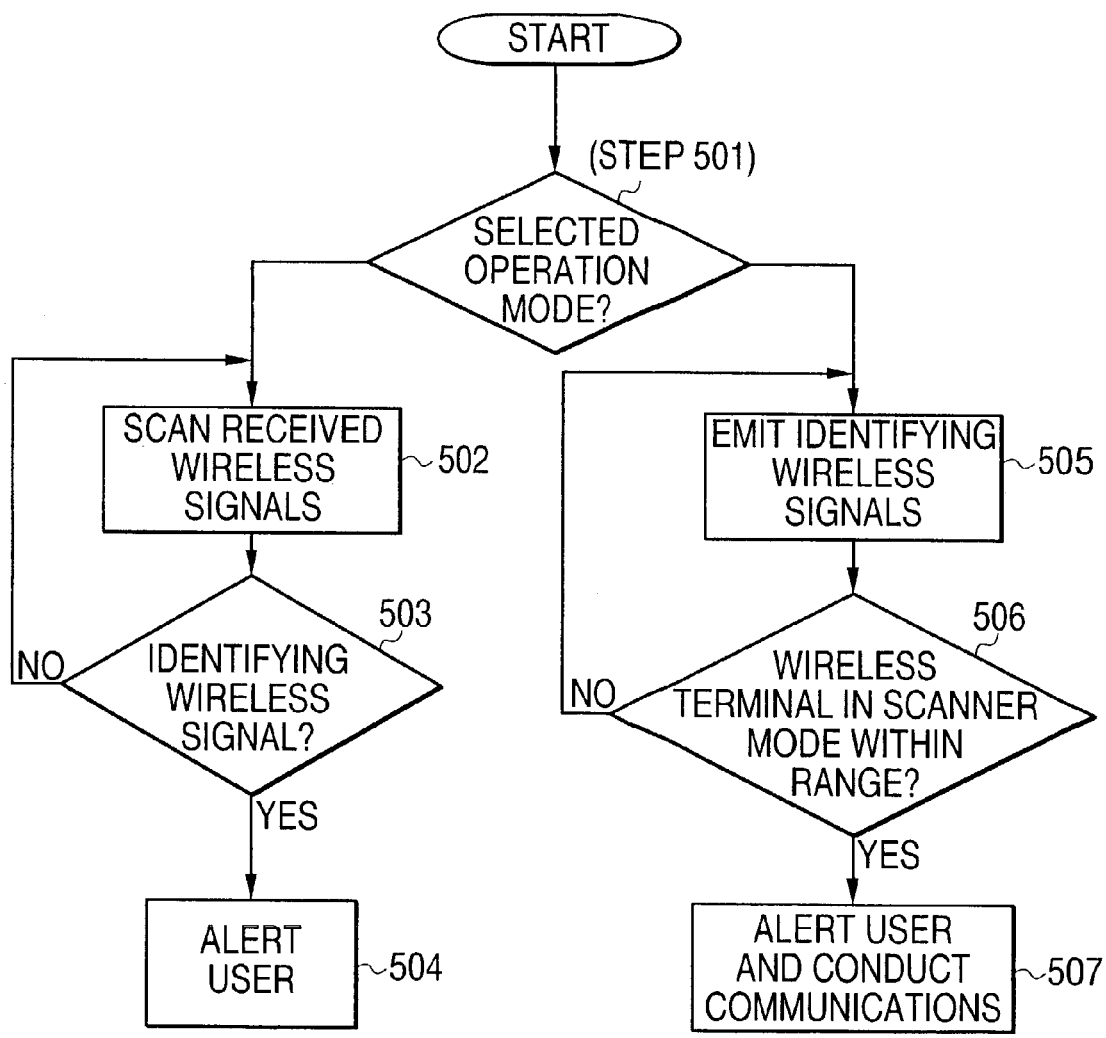
FIG. 5 is a flowchart of the operation of the wireless terminal.

According to the present invention as illustrated in FIG. 5, a user can cause each of the wireless terminals 1*a–d* to operate in any one of a plurality of operation modes including the scanner mode and the target mode as described above. Specifically as illustrated in FIG. 5, the user is allowed to input an operation mode command into the wireless terminal 1*a–d*. The processor 18 of the wireless terminal 1*a–d* analyzes the operation mode command to determine whether the user selected the scanner mode or the target mode (step 501).

If the scanner mode was selected, the wireless terminal 1*a–d* is placed in the scanner mode and begins scanning wireless signals received via the transmitter/receiver circuit 19 (step 502). The received wireless signals are analyzed to determine whether the received wireless signals are identifying wireless signals from a target device (step 503). If the received wireless signals are identifying wireless signals indicating that the target device is associated with predefined information, then the user of the wireless terminal is alerted (step 504). If the received wireless signals are not identifying wireless signals the scanning continues via step 502.

If the target mode was selected, the wireless terminal 1*a–d* is placed in the target mode and begins emitting identifying wireless signals indicating that the wireless terminal 1*a-d* is associated with predefined information input to the wireless terminal 1*a–d* by the user. The identifying wireless signals are transmitted via the transmitter/receiver circuit 19 (step 505). Thereafter, the wireless terminal 1*a–d* could, for example, monitor all received wireless signals to determine whether a wireless terminal in the scanner mode has come within range (step 506). This example would require the wireless terminal in the scanner mode to emit some type of identifying wireless signal when it enters the coverage area of a target device. If a wireless terminal in the scanner mode is within range, then the wireless terminal 1*a–d* alerts the user and establishes communication with the wireless terminal in the scanner mode (step 507). If a wireless terminal in the scanner mode is not within range, then the emitting of identifying wireless signals continues via step 505.

As per the above, the target device could, for example, be a wireless terminal as described above, a base station 52, or any other device which can emit identifying wireless signals. Such a base station 52 or device has an operation mode such as that described above that allows it to act as a target device according to steps 505–507 as illustrated in FIG. 5.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A wireless terminal for communicating with other wireless terminals in a network using wireless signals, comprising:
   an input device for inputting commands and data;
   an output device for outputting information;
   a transmitter/receiver circuit for transmitting and receiving wireless signals; and
   a controller having a plurality of user selectable modes, the controller controlling said input device, said output device and said transmitter/receiver circuit;
   wherein one of said users selected modes is a scanner mode which causes said wireless terminal to scan received wireless signals to determine whether identifying wireless signals corresponding to a target device have been received and if said identifying wireless signals have been received, outputting via said output device an indication that said wireless terminal is within range of said target device where communications with said target device can be conducted; wherein
   said users selected modes further includes:
   a target mode which causes said wireless terminal to operate as a target device and transmit identifying wireless signals identifying the wireless terminal; and further wherein
   said controller is set to the scanner mode said wireless terminal scans received wireless signals to determine whether the identifying wireless signals indicates the target device as being associated with predefined information.

2. A wireless terminal according to claim 1, wherein said identifying wireless signals indicates that said target device is associated with predefined information input by a user of the target device.

3. A wireless terminal according to claim 2, wherein said predefined information includes information concerning the user of the target device including at least one of a name of the user, hobbies of the user and marital status of the user.

4. A wireless terminal according to claim 1, wherein when said controller is set to said target mode, the user is permitted to input predefined information concerning the user and said identifying wireless signals transmitted by said wireless terminal indicate said wireless terminal is associated with the predefined information.

5. A wireless terminal according to claim 1, wherein said identifying wireless signals indicates that said target device is associated with predefined information.

6. A wireless terminal according to claim 5, wherein said predefined information is input by a user of the target device.

7. A wireless terminal according to claim 6, wherein said predefined information includes information concerning the user of the target device including at least one of a name of the user, hobbies of the user and marital status of the user.

8. A method in a wireless terminal for communicating with other wireless terminals in a network using wireless signals, comprising the steps of:
   inputting commands and data; outputting information
   transmitting and receiving wireless signals; and
   controlling the inputting of command and data, the outputting of information and the transmitting and receiving of wireless signals,
   wherein said controlling is settable by a user to one of a plurality of user selectable mode including: a scanner mode which causes scanning of received wireless signals to determine whether identifying wireless signals corresponding to a target device have been received and if said identifying wireless signals have been received, outputting via said outputting step and indication that said wireless terminal is within range of said target device where communication with said target device can be conducted; wherein said user selectable modes further includes: a target mode which causes said wireless terminal to operate as a target device and transmit identifying wireless signals identifying the wireless terminal; and further wherein said controlling is set to the scanner mode said wireless terminal scans received wireless signals to determine whether the identifying wireless signals indicates the target device as being associated with predefined information.

9. A method according to claim 8, wherein said identifying wireless signals indicates that said target device is associated with predefined information input by a user of the target device.

10. A method according to claim 8, wherein said predefined information includes information concerning the user of the target device including at least one name of the user, hobbies of the user and marital status of the user.

11. A method according to claim 8, wherein when said controlling is set to said target mode, the user is permitted to input predefined information concerning the user and said identifying wireless signals transmitted by said wireless terminal indicate that said wireless terminal is associated wit the predefined information.

12. A method according to claim 8, wherein said identifying wireless signals indicates that the target device is associated with predefined information.

13. A method according to claim 12, wherein said predefined information is input by a user of the target device.

14. A method according to claim 13, wherein said predefined information includes information concerning the user of the target device including at least one of a name of the user, hobbies of the user and marital status of the user.

* * * * *